April 29, 1924.

A. J. KERCHER ET AL 1,492,540

ELECTRICAL HEATING DEVICE

Filed June 5, 1922

WITNESS
H. Sherburne

INVENTORS
ARTHUR J. KERCHER,
W. WESLEY HICKS.
BY
White Prost Evans
their ATTORNEYS Patented Apr. 29, 1924.

1,492,540

UNITED STATES PATENT OFFICE.

ARTHUR J. KERCHER, OF BERKELEY, AND WILLIAM WESLEY HICKS, OF SAN FRANCISCO, CALIFORNIA.

ELECTRICAL HEATING DEVICE.

Application filed June 5, 1922. Serial No. 565,805.

*To all whom it may concern:*

Be it known that we, ARTHUR J. KERCHER and WILLIAM WESLEY HICKS, citizens of the United States, and residents, respectively, of the city of Berkeley, county of Alameda, in the State of California, and the city and county of San Francisco, in the State of California, have invented a new and useful Electrical Heating Device, of which the following is a specification.

Our invention relates to a heating unit, and more particularly to a hot plate, such as used either in connection with electrical ranges, or as separate units for ordinary household cooking. It is one of the objects of our invention to provide such a device that will cause substantially all of the heat generated by the heating coils to be conducted to the surface exposed for use in cooking. Another object of our invention is to render the heating coils readily renewable, so that if any of them should be burned out, there would be no necessity for discarding the entire hot plate.

Our invention possesses other advantageous features, some of which, with the foregoing, will be set forth at length in the following specification where we shall outline in full that form of the invention which we have selected for illustration in the drawings accompanying and forming part of our present specification. In the drawings we have shown one embodiment of our invention, but it is to be understood that we do not limit ourselves to that form, since the invention as expressed in the claims may be embodied in other forms as well.

Referring to the drawings.

Figure 1:
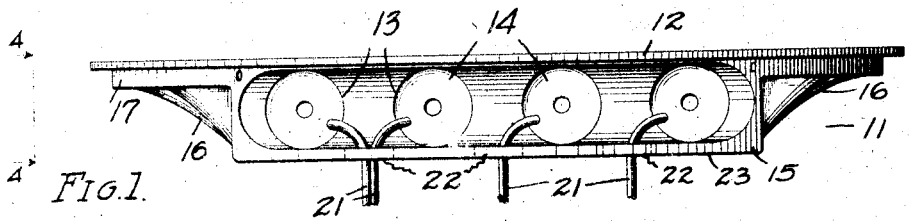
Figure 1 is a side view of the hot plate with the bottom cover removed.

The hot plate 11 is conveniently made from a casting, such as iron, steel, or any other good conductor of heat. This plate has a surface 12 upon which the article to be heated is placed. Extending transversely of the plate and below the surface 12 are a plurality of apertures 13 which serve to accommodate the heating elements 14. These elements are wound on long spools, and consist of the proper length and size of resistance wire.

The apertures 13 are formed either by casting or drilling, in the portion 15 of the hot plate. This portion serves as the housing for the heating elements, and is made an integral part of the plate 11, extending as a projection downwardly from the exposed surface 12. This portion is furthermore just wide enough to accommodate the heating elements 14, close to each other as clearly shown in Fig. 2. In this way the heat is concentrated at the middle portion of the hot plate. Strengthening ribs 16 may be provided for bracing the portion 15 at its sides. A bead 17 depends from the plate to provide a surface engaging the bottom cover 18.

Figure 2:
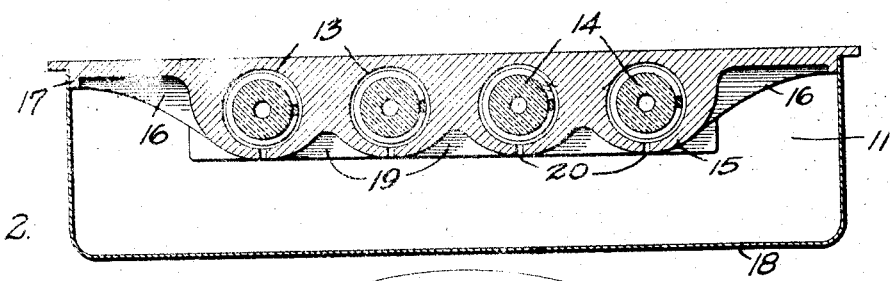
Fig. 2 is a sectional view of the hot plate showing the configuration of the metal around the heating elements.
Figure 3:
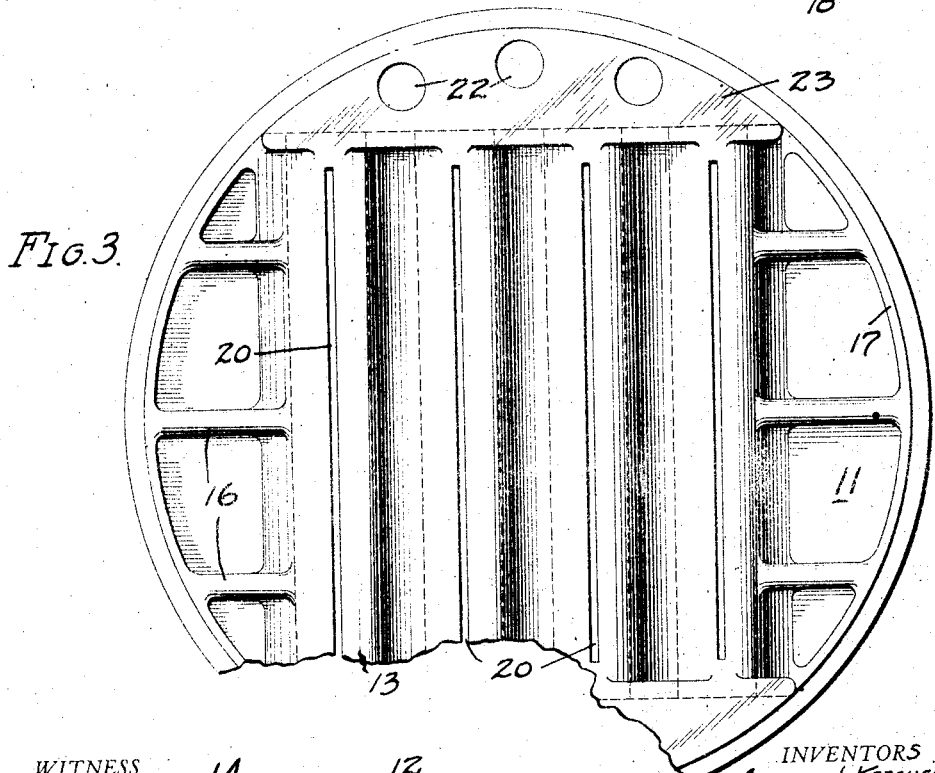
Fig. 3 is a view from the bottom of the device.

One of the important features of our invention is the configuration of the heat conducting metal around the enclosed heating elements 14. This configuration is best shown in Fig. 2. Some of the metal is hollowed out between elements, as indicated at 19, so that only a relatively thin portion of metal extends around and adjacent the bottom portion of the heating elements 14. However, the metal increases in width continuously as the surface 12 is approached. The under surface rises to a crest between the elements 14. The heat conducting properties of the metal, in connection with its configuration, cause substantially all of the heat generated to become concentrated at the top of the plate, where it is needed, and no great amount of heat is wastefully radiated from the bottom surface.

It is also another important advantage that the heating elements 14 may be readily slipped out and replaced while the cover 18 is removed.

In order to prevent the generation of injurious eddy currents in the metal surrounding the elements 14, the electrical conductivity is interrupted by saw cuts 20 through the bottom of portion 15, extending into the apertures 13.

Figure 4:
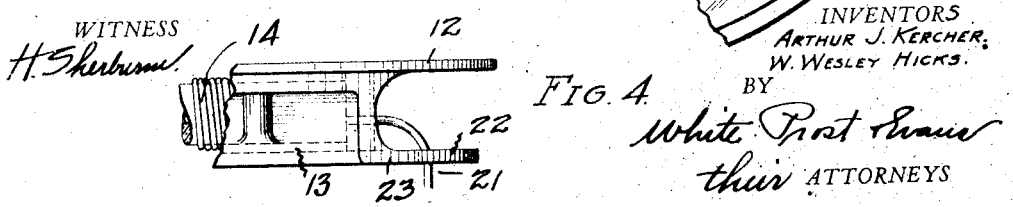
Fig. 4 is a side view from line 4—4 of Fig. 1.

The leads 21 from the heating elements 14 are most conveniently passed through the apertures 22 located in the extension 23 parallel to the top surface 12, and below the apertures for the heating units 14. This extension is most clearly shown in Fig. 4.

We claim:

1. In an electrical heating device, a heat conducting member having a plurality of long, parallel arranged apertures lying close to one another, and removable heating elements arranged in said apertures, the heat conducting member being so formed that it encompasses substantially entirely each of the heating elements with a relatively thin amount of material on the side farthest from the surface to be heated, and with gradually and substantially uniformly increasing material as this surface is approached.

2. In an electrical heating device, a heat conducting member having an exposed surface which is to be heated, and a plurality of heating elements embedded in the member, so arranged that the heat conducting material enveloping the heating elements increases gradually and substantially uniformly as the heated surface is approached from that locality which is farthest from the heated surface.

3. In an electrical heating device, a metallic plate, an integral heating element housing disposed below said plate and provided with a plurality of parallel apertures adapted to receive the heating elements, said housing being provided below each aperture with a slot interrupting the continuity of the metal around the aperture and a heating element in each aperture.

4. In an electrical heating device, a metallic plate, an integral heating element housing disposed below said plate and provided with a plurality of parallel apertures adapted to receive the heating elements, said housing having an undulating under surface rising to a crest between a pair of parallel apertures, and toward the plate, said undulating surface providing such a disposition of the material making up the housing that a gradually increasing thickness of material exists around each aperture from the point of the aperture farthest from the plate, toward said plate.

In testimony whereof, we have hereunto set our hands.

ARTHUR J. KERCHER.
WILLIAM WESLEY HICKS.